(12) United States Patent
Sauvestre et al.

(10) Patent No.: US 8,827,252 B2
(45) Date of Patent: Sep. 9, 2014

(54) METHOD, PLANT AND APPARATUS FOR MAKING PARTS MADE OF COMPOSITE MATERIAL

(75) Inventors: Claude Sauvestre, Turin (IT); Fabrizio Turris, Turin (IT); Claudio Berionni, Turin (IT); Giovanni Lanfranco, Turin (IT)

(73) Assignee: Alenia Aermacchi S.p.A., Venegono Superiore (Varese) (IT)

( * ) Notice: Subject to any disclaimer, the term of this patent is extended or adjusted under 35 U.S.C. 154(b) by 385 days.

(21) Appl. No.: 12/376,673

(22) PCT Filed: Sep. 20, 2007

(86) PCT No.: PCT/IB2007/002744
§ 371 (c)(1),
(2), (4) Date: Jul. 10, 2009

(87) PCT Pub. No.: WO2008/053288
PCT Pub. Date: May 8, 2008

(65) Prior Publication Data
US 2010/0175816 A1    Jul. 15, 2010

(30) Foreign Application Priority Data
Aug. 11, 2006   (IT) .............................. TO2006A0600

(51) Int. Cl.
*B25B 11/00* (2006.01)
*B29C 70/38* (2006.01)
*B29C 70/54* (2006.01)
*B29C 70/32* (2006.01)

(52) U.S. Cl.
CPC ................ *B29C 70/38* (2013.01); *B29C 70/54* (2013.01); *B29C 70/32* (2013.01)

USPC ............ 269/21; 156/538; 156/539; 156/556; 294/188; 294/189

(58) Field of Classification Search
CPC ........ B65H 5/222; B65H 5/08; B65H 3/0808; B65H 3/0883; B25B 11/007; B25B 11/005; B66C 1/02; B66C 1/0206
USPC ............. 156/556, 538, 539; 269/21; 294/188, 294/189
See application file for complete search history.

(56) References Cited

U.S. PATENT DOCUMENTS 3,377,096 A * 4/1968 Wood ............................ 294/189
3,848,327 A * 11/1974 Gerber et al. ................... 29/559

(Continued)

FOREIGN PATENT DOCUMENTS

WO    2004/035286 A1    4/2004
WO    2006/001860 A2    1/2006

*Primary Examiner* — Christopher Schatz
(74) *Attorney, Agent, or Firm* — Sughrue Mion, PLLC

(57) ABSTRACT

The invention concerns a plant for manufacturing parts made of composite material, in particular sections for an aircraft fuselage, having at least a compaction station in which, in operation, there are provided a mandrel coated of composite material to be compacted and a transport mechanism arranged to transport at least one compaction device on said composite material. The transport mechanism is associated with at least one sling having at least one strip of porous material that, in operation, is in direct contact with the compaction device, and the sling is configured to transport the compaction device onto the composite material through application of a vacuum source at least to the strip of porous material. The invention also concerns a method of and an apparatus for manufacturing parts made of composite material.

12 Claims, 5 Drawing Sheets

(56) References Cited

U.S. PATENT DOCUMENTS

| | | |
|---|---|---|
| 5,092,954 A | 3/1992 | Braun et al. |
| 6,692,681 B1 * | 2/2004 | Lunde .......................... 264/510 |
| 2003/0030161 A1 * | 2/2003 | Pegram et al. ................. 264/2.5 |
| 2003/0203066 A1 * | 10/2003 | Lust et al. .................... 425/183 |
| 2006/0070704 A1 * | 4/2006 | Sinclair et al. ............... 156/539 |
| 2006/0231981 A1 | 10/2006 | Lee et al. |

* cited by examiner

METHOD, PLANT AND APPARATUS FOR MAKING PARTS MADE OF COMPOSITE MATERIAL

CROSS REFERENCE TO RELATED APPLICATION

This application is a National Stage of International Application No. PCT/IB2007/002744 filed Sep. 20, 2007, claiming priority based on Italian Patent Application No. TO2006A000600, filed Aug. 11, 2006, the contents of all of which are incorporated herein by reference in their entirety.

TECHNICAL FIELD

The present invention generally relates to a method of manufacturing parts made of composite material, to a plant comprising apparatuses suitable for the manufacture of the parts made of composite material and to an apparatus for manufacturing said parts.

In particular, the present invention concerns a method, plant and apparatus for manufacturing fuselage sections, having a given shape, to be assembled in order to build an aircraft fuselage.

More particularly, the present invention concerns a method, plant and apparatus for manufacturing fuselage sections through compaction, e.g. by bagging, and through thermal treatment (curing) and debagging.

For sake of simplicity of description, unless otherwise specified, hereinafter reference will be made to a method of and a plant for manufacturing, through bagging, curing and debagging, fuselage sections to be assembled in order to build an aircraft fuselage, even if the invention is generally applicable for manufacturing body sections made of composite material for terrestrial and other vehicles.

PRIOR ART

It is known that one way to increase aircraft performance is to use composite materials, such as for instance carbon fibre materials, which generally have the property of associating a high stiffness with a low specific weight.

Use of composite materials for manufacturing fuselage sections demands particularly complex methods and systems.

Patent publication WO 2006/001860 discloses for instance a method of compacting fuselage sections consisting of stiffeners and of a fabric of composite material wrapped around the stiffeners.

According to said prior art, compaction of the fuselage sections made of composite material, before applying thereto a thermal treatment arranged to cure the composite material, requires use of an apparatus having clam-shell supports and arranged to contain the fuselage section mounted on a suitable mandrel whose size and shape correspond to those of the fuselage section.

More particularly, according to the prior art, the supports in the apparatus include a pair of pressure pads with half-circular cross-section, and a pair of conformable pads or caul sheets (caul plates) with half-circular cross-section, housed in the pressure pads.

In use, the supports are arranged to slide on suitable tracks so as to push the pressure pads and the conformable pads against the fuselage section. Subsequently, the supports are retracted and vacuum bags are applied to the pressure pads so as to conform the conformable pads to the fuselage shape and to apply even pressure on the fuselage section during the curing step.

A first problem with the prior art is that fuselage sections with a length of 10 to 20 metres and a diameter exceeding 6 m require use of pairs of pressure pads and associated caul sheets (caul plates) with a weight of the order of some tons, even in case of caul sheets with very small thickness, for instance 1 to 2 mm.

As known, manipulating large and heavy masses is generally extremely difficult.

A second problem with the prior art is that caul sheets shaped so as to "cover" a half-circular cross-section of a cylinder length adapt with difficulty to the fuselage shape that, as known, is not cylindrical but basically oval.

A third problem with the prior art is that, due to the considerable weights of the pressure pads and/or the caul sheets, any replacement thereof because of a change in the fuselage shape or dimensions requires e.g. the use of an apparatus with a correspondingly considerable loading capacity.

In synthesis, the Applicant has realised that the solution proposed by the prior art is difficult to apply in case of fuselage sections with a great length, e.g. exceeding 10 m, and great diameter, e.g. exceeding 6 m.

DESCRIPTION OF THE INVENTION

It is an object of the present invention to provide a method of and a plant for manufacturing parts made of composite material, which do not suffer from the above described problems of the prior art.

It is also an object of the present invention to provide a simplified apparatus for manipulating the caul plates.

This object is achieved by the claimed method of and plant for manufacturing parts made of composite material, more particularly fuselage sections.

The present invention also concerns an apparatus for manufacturing parts made of composite material.

The appended claims are an integral part of the technical teaching provided here in respect of the invention.

In accordance with a preferred embodiment, the plant for manufacturing parts made of composite material includes means for transporting compaction devices or caul plates having one or more strips of porous material arranged to be vacuum-operated in order to pick up the caul plates. Such a solution allows carrying out the transportation in safe way, without affecting the mechanical properties of the caul plates.

In accordance with another feature of the present invention, the means for transporting the compaction devices also includes a bridge crane arranged to be displaced at least along a predetermined direction for picking up and leaving the caul plates, and interface means arranged between the bridge crane and the caul plates and configured to allow displacing the caul plates in any direction on a plane orthogonal to the predetermined picking up and leaving direction.

BRIEF DESCRIPTION OF THE DRAWINGS

The above and other features of the invention will become apparent from the following description of preferred embodiments thereof, made only by way of non limiting example with the help of the accompanying drawings, in which elements denoted by a same or similar numerical reference identify components having the same or similar function and construction, and in which:

FIG. 3b schematically shows a detail of the mechanical interface assembly of FIG. 3a;

DESCRIPTION OF A PREFERRED EMBODIMENT

Figure 1:
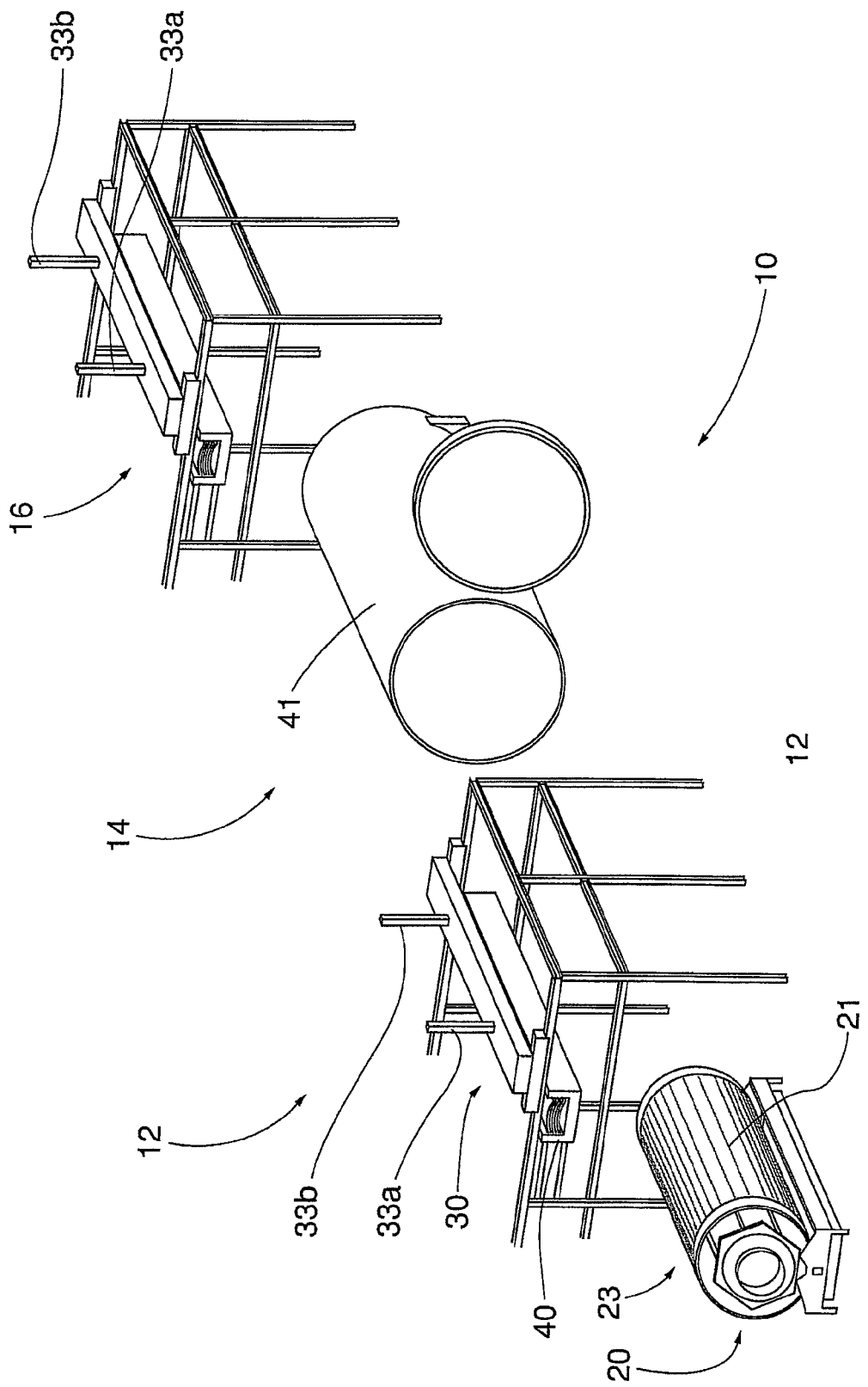
FIG. 1 is a schematic view of a plant for manufacturing parts made of composite material.

Referring to FIG. 1, a plant 10 for manufacturing parts made of composite material, e.g. sections 23 of an aircraft fuselage, comprises a plurality of working stations, more particularly, a station 12 for performing a compaction cycle on a fuselage section (bagging station), a station 14 for performing a heat treatment cycle (curing station), and a station 16 for performing a cycle for recovery of the materials (debagging station).

Figure 2:
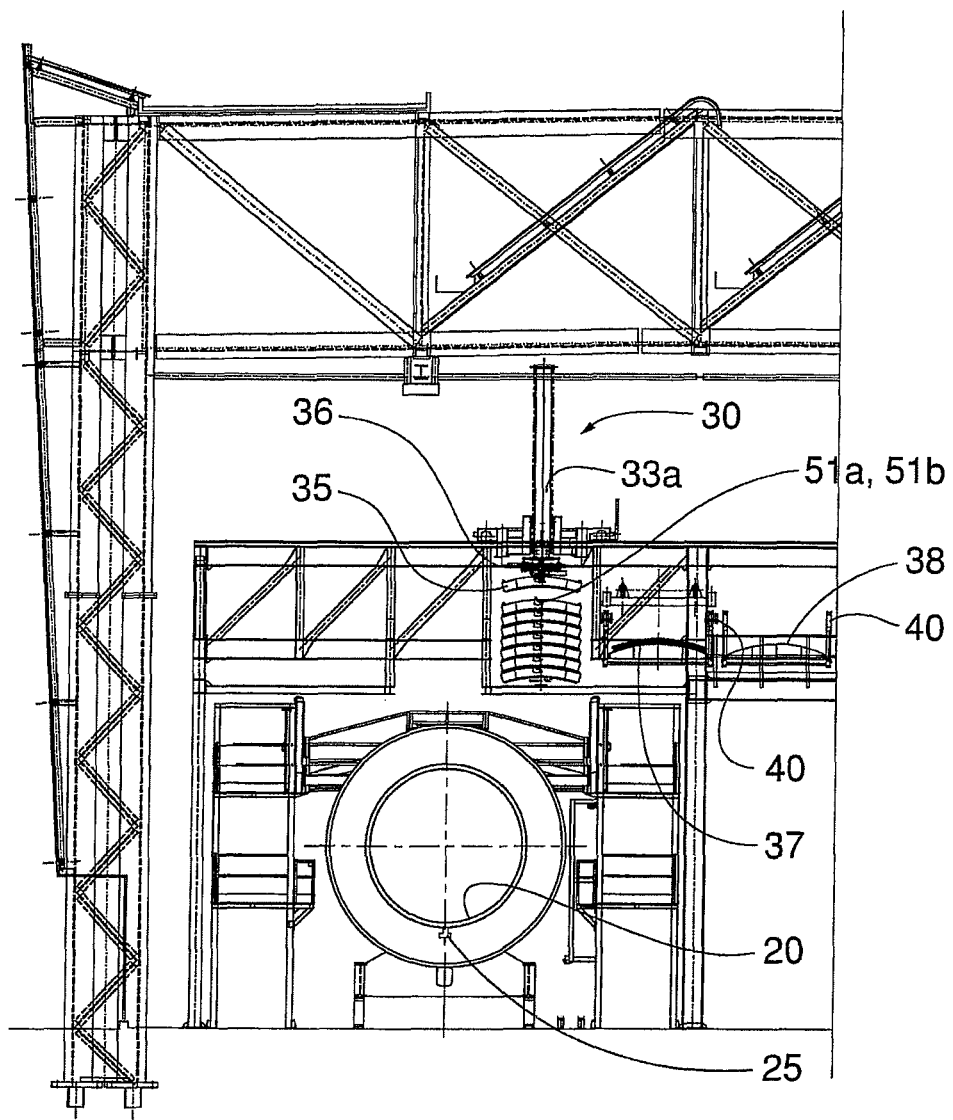
FIG. 2 is a front view of a station of the plant of FIG. 1.

For instance, in bagging station 12, compaction of a fuselage section 23 of uncured composite material is performed by applying compaction devices (conformable plates or caul plates) 37 (FIG. 1, FIG. 2) and/or vacuum bags to the fuselage section. In curing station 14, fuselage section 23 is introduced into a furnace 41 arranged to polymerise (cure) the fuselage section, i.e. the material of the fuselage section, subsequently to compaction. In the debagging station, caul plates 37 and/or the vacuum bags are removed from fuselage section 23.

In the preferred embodiment, bagging station 12 is kept in a controlled atmosphere to avoid contamination of the uncured composite material, as it can be readily understood by the skilled in the art. Preferably, on the contrary, curing station 14 and debagging station 16 are not kept in a controlled atmosphere.

Plant 10 also includes a mandrel 20, preferably of cylindrical shape, having a rotation axis corresponding to the cylinder axis and arranged, in known manner, to rotate about its axis. Mandrel 20 is also arranged to be moved to the different stations 12, 14, 16 in order the respective workings envisaged can be performed.

In the preferred embodiment, mandrel 20, having for instance a radius of 2.5 to 3.5 m and a length of 10 to 20 m, also includes pairs of fastening members 25, e.g. eight pairs, which are positioned along the external circumference of mandrel 20.

According to the present exemplary embodiment, in bagging station 12 the mandrel 20 includes stiffeners covered of carbon fibre fabric 21, which for instance are already mounted on the mandrel.

The plant, in the preferred embodiment, also includes at least one bridge crane 30 and a plurality of containers or boxes 40.

As it will be described in more detail below, bridge crane 30 is arranged to pick up caul plates 37 from boxes 40 and place them on the mandrel and vice versa. In order to carry out such operation, the bridge crane is displaceable in a first direction with a predetermined alignment relative to mandrel 20, e.g. at 90° to the mandrel axis, and in a second direction for picking up and leaving caul plates 37.

Figure 3A:
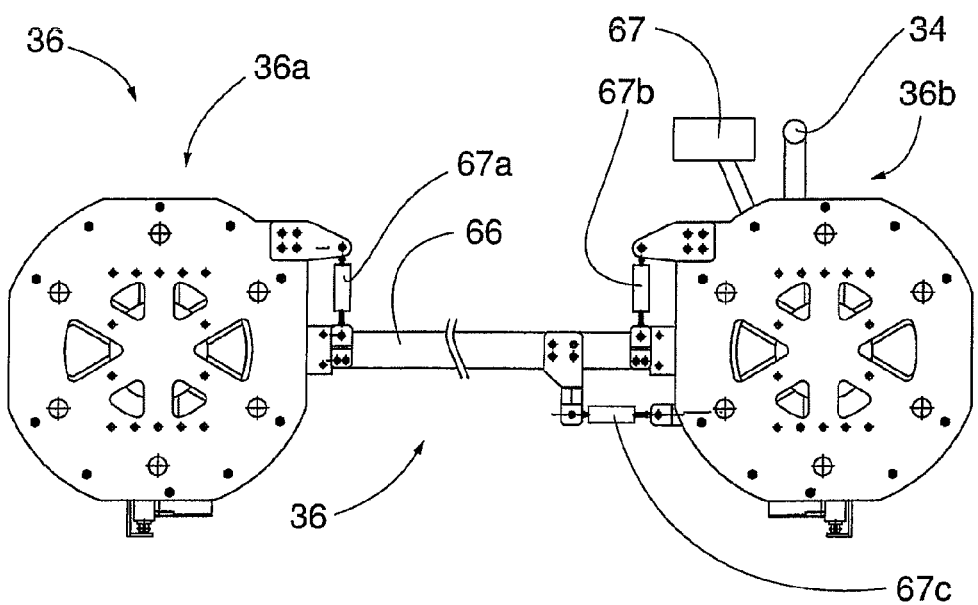
FIG. 3a shows a mechanical interface assembly included in the plant of FIG. 1.

In the preferred embodiment, bridge crane 30 includes a pair of uprights 33a and 33b, respectively, e.g. electrically motorised uprights, located at a certain distance from each other in the direction of the axis of mandrel 20 and arranged to be raised or lowered in synchronous manner along the second direction (picking up and leaving direction), and a mechanical interface assembly 36 (FIG. 1, FIG. 2, FIG. 3a), configured to float on a plane orthogonal to the picking up and leaving direction.

Interface assembly (floating assembly) 36 of bridge crane 30 can be connected to a sling 35 configured to pick up and leave caul plates 37, as it will be disclosed in detail below.

Figure 3B:
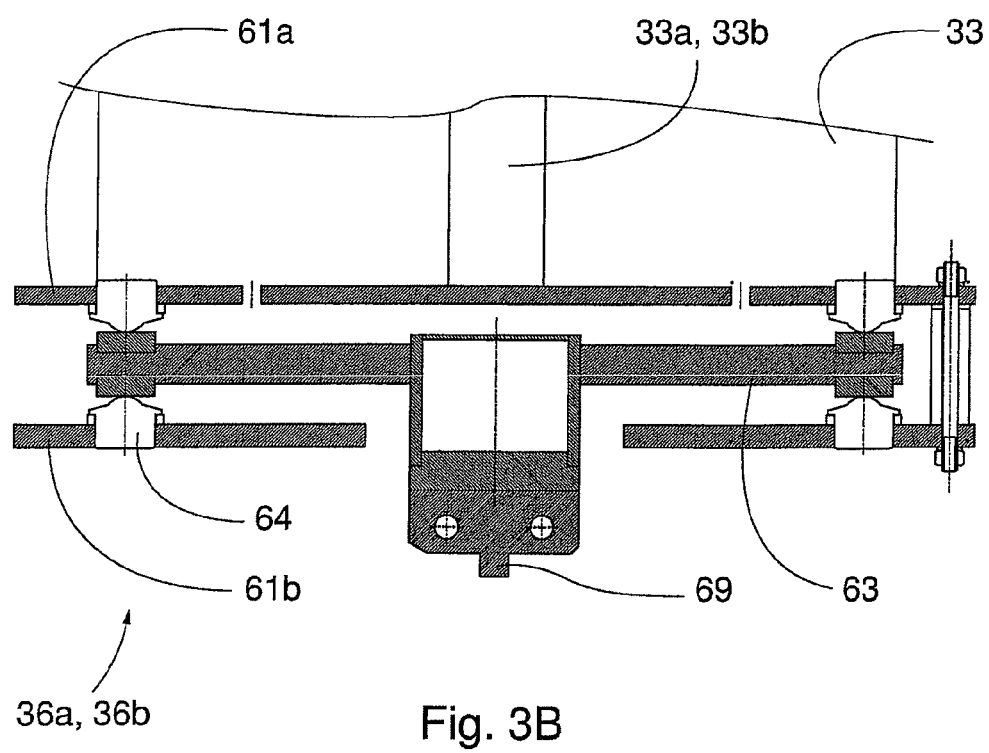
Figure 4A:
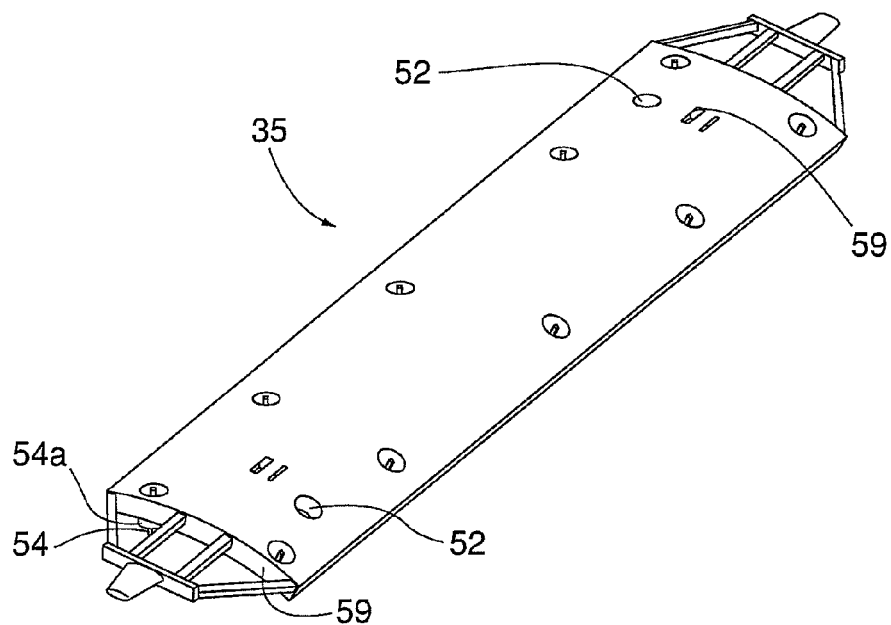
FIGS. 4a and 4b are top and bottom perspective views of a sling included in the plant of FIG. 1.
Figure 4B:
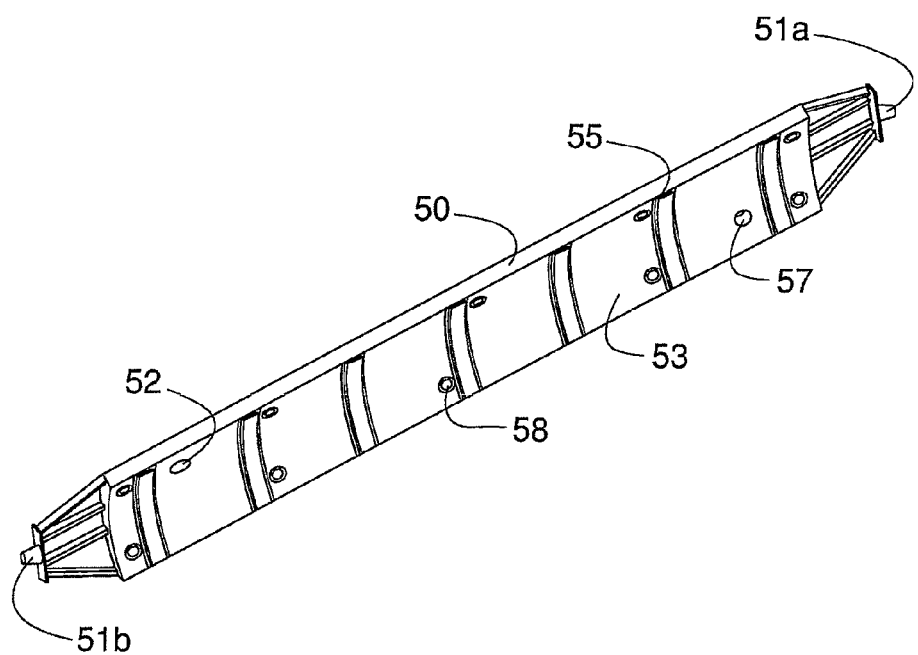

Interface assembly (floating assembly) 36 is interposed, in operation, between uprights 33a and 33b and sling 35. It has predetermined orientation axes X and Y and includes (FIG. 3a, FIG. 3b) a pair of floating devices 36a and 36b, which are preferably located in correspondence of uprights 33a and 33b and are connected to each other through an axle (axle of the floating assembly) 66 arranged to define, for instance, axis Y of the floating assembly.

Floating assembly 36 also includes a compressed air intake 34 arranged to be coupled with sling 35, as it will be disclosed in detail below.

Each floating device 36a and 36b preferably includes a pair of flat elements 61a and 61b (FIG. 3a, FIG. 3b), facing each other and internally including a further flat element 63, which is rigidly connected to axle 66 of the floating assembly and has coupling elements 69, of known type, arranged to be mechanically and removably coupled with corresponding coupling elements 59 (FIG. 3a, FIG. 3b, FIG. 4a, FIG. 4b) in slings 35.

Preferably, flat elements (facing elements) 61a and 61b include one or more bearings 64, e.g. a plurality of balls, configured to enable a relative movement of the further flat element (moving element) 63 relative to facing elements 61a and 61b.

Floating assembly 36 also includes motors 67a, 67b and 67c, e.g. stepping motors, of known type, connected to axle 66 of the floating assembly in order to monitor and control the movements of moving elements 63.

Finally, floating assembly 36 includes optical centring devices 67, of known type, arranged to align floating assembly 36 and sling 35 with caul plate 37, as it will be disclosed in detail below. Optical devices 67 include e.g. a fixed camera configured to detect centring locators, and laser emitters for measuring distances from surfaces.

The configuration described above, as it will be readily appreciated by the skilled in the art, is arranged to enable coupling elements (grippers) 69 of floating assembly 36 to take any position, of course within a range limited by the travel of motors 67a, 67b and 67c, in a plane orthogonal to the picking up and leaving direction of bridge crane 30, and to enable optical devices 67 to both detect objects to be handled and track them by sighting suitable optical locators provided on the objects.

Sling 35 has a substantially concave shape with a curvature radius that preferably is equal to or slightly greater than the radius of mandrel 20. The sling comprises a box-type element 50, i.e., a vacuum chuck, with a concave lower or internal surface 53 and a pair of fastening members 51a and 51b configured to cooperate, in known manner, with fastening members 25 (FIG. 2, FIG. 4a, FIG. 4b) in mandrel 20 and to ensure self-centering between the sling and the mandrel and the fastening thereof.

In the preferred embodiment, there are as many slings 35 as caul plates 37 to be mounted on mandrel 20 (e.g. eight). The slings have predetermined orientation axes X and Y and have sizes slightly smaller, e.g. by some ten centimetres, than the sizes of caul plates 37.

Box-type element 50 of sling 35 includes, for instance, ore or more slots 52 located so as to enable optical devices 67 to sight the objects to be handled, and at least one connector 54 for a vacuum pump 54a, e.g. a Venturi pump, arranged to be connected to compressed air intake 34 for creating vacuum in box-type element 50.

In the preferred embodiment, box-type element 50 of sling 35 also has one or more hollows 55 of predetermined length, distributed e.g. in regular manner on internal (concave) surface 53. In the exemplary embodiment, the hollows are arranged transversally relative to the box-type element, but other arrangements are possible without thereby departing from the scope of the description and the claims.

Figure 5:
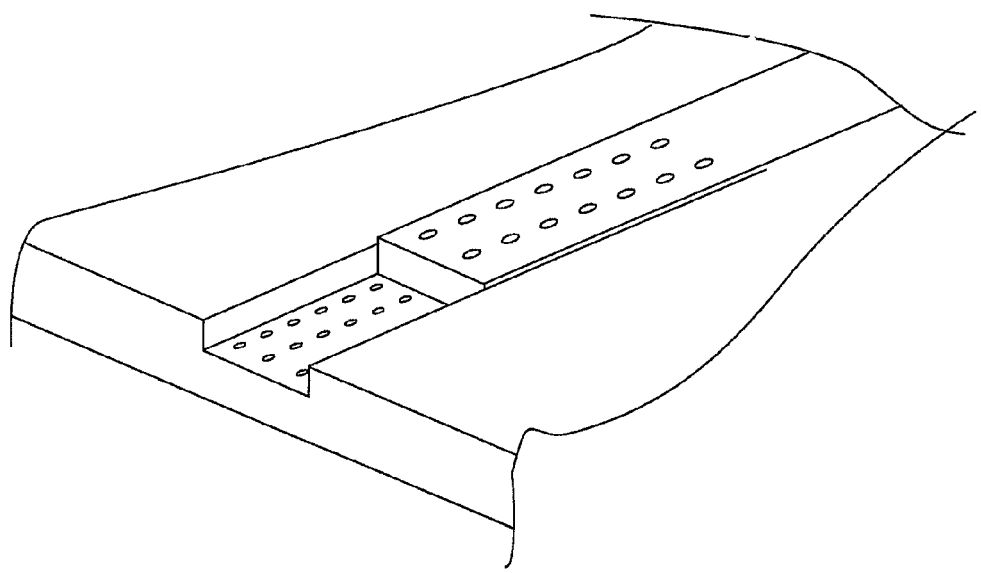
FIG. 5 shows a detail of the sling of FIGS. 4a and 4b.

In the exemplary embodiment described here, six hollows 55 are provided and they are spaced apart by 2.5 to 3.0 m, are 20 to 30 cm wide and are 2 to 5 mm deep relative to the concave surface. The surfaces of hollows 55 are covered with holes 55a (FIG. 4a, FIG. 4b, FIG. 5), of which the diameter (e.g. 2 to 5 mm), the number and the distribution are preferably determined depending on the kind of objects (in terms of weight and size) to be transported.

According to the present exemplary embodiment, one or more strips 57 of porous material, e.g. strips of semi-closed foam such as EPDM (Ethylene Propylene Diene Monomer) foam NITTO 686 or strips of a foam with similar characteristics, are associated with each hollow 55 and are preferably glued to the hollow.

Strips 57 of porous material (foam strips or foam) have a plurality of holes 57a, preferably through-holes with a diameter slightly greater than that of holes 55a in the hollows, respectively located in correspondence with holes 55a in hollows 55. Foam strips 57 have, for instance, a width equal to or slightly smaller (by some millimetres) than the hollow width, and a thickness of 40 to 60 mm, so that they project from concave surface 53 of box-type element 50.

In operation, sling 35 (FIGS. 1 to 5), coupled to floating assembly 36 by means of grippers 69, is carried close to caul plates 37, by sighting suitable locators present on the caul plate, so that vacuum application through connector 54 and associated pump 54a can create in correspondence with foam 57 a depression sufficient to enable caul plate 37 to be coupled to sling 35 for being transported.

Foam 57, being resilient, is compressed while still projecting from the sling, and thereby makes adhesion of caul plate 37 to sling 35 easier. At the same time, the foam does not deform the caul plate during transportation, since it is distributed over a wide area of caul plate 37.

As it will be described in detail below, thanks to such a structure slings 35 are adapted in particular to pick up, displace and put down large caul plates 37, e.g. rectangular caul plates with predetermined orientation axes X and Y, 10 to 15 m long, 2 to 3 m wide, 1.5 to 2 mm long and with an overall weight of, or exceeding, 200-250 Kg, without causing undesired deformation of the caul plates, thanks to the provision of the foam that continuously conforms to the caul plate shape.

The embodiment described here enables therefore handling large and heavy compaction devices while preventing caul plate deformation that could occur, for instance, when mechanical transport devices or suckers are used.

In the preferred embodiment, the caul plates are rectangular and identical to one another, yet, depending on the shape of fuselage section 23, they could even be different from one another, without thereby departing from the scope of the description and the claims.

Of course, in further embodiments, the caul plates can have any shape, related with the shape of the parts of composite material to be manufactured, without thereby departing from the scope of the description and the claims.

According to the present exemplary embodiment, the caul plates have one or more optical locators on one face, e.g. the upper face. However, in other embodiments, the optical locators can be replaced by mechanical locators without thereby departing from the scope of the description and the claims.

Preferably, slings 35 are identical to one another, yet, depending on the entity of variation in the sizes of the caul plates, they could even be different from one another and have a shape similar to that of the caul plates, without thereby departing from the scope of the description and the claims.

The operation of the plant described above is as follows.

Bagging station 12 where the compaction cycle is performed is considered first and an initial condition is referred to in which a first box 40 contains eight stacked slings 35, a second box 40 contains eight caul plates 37 which are spaced apart from one another by separating sheets 38, e.g. of rubber, and are stacked with scarce accuracy, e.g. ±30 mm relative to X and Y axes, and a third box 40 is empty.

In a first step, crane bridge 30 is positioned in correspondence of the first box 40 and uprights 33a and 33b are lowered so that floating assembly 36 picks up the first sling 35 from the first box 40 with the help of optical devices 67 and grippers 69.

Simultaneously with the gripper coupling, connector 54 is also coupled with compressed air intake 34, preferably in automatic manner. Eventually, uprights 33a and 33b are raised again to a level sufficient in order bridge crane 30 can move from the first box 40 to another box 40.

In a second step, crane bridge 30 is positioned in correspondence of the second box 40 and uprights 33a and 33b are lowered so that sling 35 approaches the first caul plate 37, with the help of optical devices 67 provided on floating assembly 36.

According to the present exemplary embodiment, each caul plate 37 has at least one optical reference locator, of known type, configured to enable optical devices 67 to monitor the exact position of the caul plate in box 40 and to enable floating assembly 36 and sling 35 to be positioned, e.g. automatically, at a predetermined relative position with respect to caul plate 37, e.g. so that X and Y axes of sling 35 coincide with X and Y axes, of caul plate 37.

Once the predetermined relative position has been reached, sling 35 is pushed, in controlled manner, against caul plate 37 and vacuum creation in box-type element 50 is started.

Such operation causes foam 57 of sling 35 to adhere to caul plate 37 so that the latter can be lifted and transported to mandrel 20.

During this second step, sling 35 is displaced together with floating assembly 36 coupled thereto, so as to take a predetermined relative position, or zero position, relative to bridge crane 30.

Because of the latter operation caul plate 37, which is already aligned with sling 35, becomes also aligned with bridge crane 30 in order to be positioned with extremely high accuracy on mandrel 20.

In a third step, sling 35 and caul plate 37 are transported by bridge crane 30 in correspondence of mandrel 20 and lowered onto the mandrel.

During this step, fastening members 51a and 51b on sling 35 cooperate with fastening members 25 on mandrel 20 thereby making the self-centring between sling and the fastening of the sling to the mandrel easier. Such operation allows positioning caul plate 37 on mandrel 20 with an extremely low positioning tolerance, e.g. a tolerance of ±5 mm on both the X and the Y axis.

Upon completion of, or simultaneously with the fastening, vacuum creation is stopped, e.g. by disconnecting the compressed air intake.

That operation causes the caul plate to be strongly pushed, partly by gravity and partly due to the instant expansion of foam 57 (spring effect because of the stopping of vacuum creation), against composite material fabric 21 so as to exert a strong pressure thereon.

Once the fastening has been carried out, uprights 33a and 33b are raised to a level sufficient to enable bridge crane 30 to move from mandrel 20 to the first box 40.

In a fourth step, uprights 33a and 33b are lowered so that floating assembly 36 picks up the second sling 35 from the first box 40 with the help of optical devices 67 and grippers 69.

Simultaneously with the gripper coupling, connector 54 is also coupled with compressed air intake 34, preferably in automatic manner. Eventually, uprights 33a and 33b are raised again to a level sufficient in order bridge crane 30 can move from the first box 40 to another box 40.

In a fifth step, crane bridge 30 is positioned in correspondence of the second box 40 and uprights 33a and 33b are lowered so that sling 35 approaches the first separation sheet 38, with the help of optical devices 67 provided on floating assembly 36, picks up said sheet once vacuum creation in box-type element 50 is started, so as to transport the sheet to the third box 40, which is still empty, and leaves the sheet therein while vacuum creation is stopped, in similar manner to what described above.

Upon completion of the fifth step, the second to fifth steps are sequentially repeated until all caul plates 37 and all slings are fastened to mandrel 20.

During positioning of the different caul plates 37, they are fastened to the mandrel so that a predetermined spacing exists between adjacent caul plates.

For instance, in a first embodiment, a spacing or gap of about 10 mm exists between adjacent caul plates, such gap being adapted to enable not only the fastening of perimetral vacuum bags between adjacent caul plates and between the caul plates and the outer circumferences of mandrel 20, but also removal of all slings, once the application of the perimetral vacuum bags has been completed.

In such a first embodiment, upon completion of sling removal, a conventional vacuum bag is applied to the fuselage section and bagged mandrel 20 is transferred to curing station 14.

In a second embodiment, the slings are kept fastened to the mandrel and mandrel 20, without vacuum bags, is directly transferred to curing station 14, which in such case is preferably in controlled atmosphere. Of course such operation can be performed provided a satisfactory compaction has been obtained by the mechanical application of the caul plates and the slings.

The thermal treatment cycle, of known type, entails autoclave curing of fuselage section 23 in curing station 14.

The cycle of recovery of materials is performed in debagging station 16. In the first embodiment, an initial condition is chosen in which for instance a first box 40 contains eight stacked slings 35, a second box 40 is empty, a third box 40 contains seven separating sheets 38 and a fourth box 40 is empty.

The steps performed in such cycle substantially correspond to the inverse of the steps already described for the compaction cycle, with the only modification that the slings are used both for removing the caul plates (to be put into the second box 40) from the mandrel and for removing the vacuum bag residuals associated with each caul plate (to be put e.g. into fourth box 40).

In the second embodiment, an initial condition in which a first box 40 is empty, a second box 40 is empty and a third box 40 contains seven separating sheets 38 is for instance chosen for the cycle of recovery of materials in debagging station 16.

The steps performed in such cycle substantially correspond to the inverse of the steps already described for the compaction cycle.

In the preferred embodiment, foam 57 is configured so as to project from internal surface 53 of box-type element 50 both in case vacuum is not created and in case vacuum is created.

More particularly, in case vacuum is created, foam 57 projects by at least 1 mm from internal surface 53 of box-type element 50 so as to favour the adhesion force of caul plate 37 to foam 57, by preventing, for instance, an adhesion-contrasting effect due to the contact between the caul plate and the box-type element.

In other embodiments, further to foam 57, a predetermined number of suckers 58, also projecting from internal surface of box-type element 50, are provided on internal surface of box-type element 50, which suckers are connected to vacuum pump 54a and are configured to cooperate with foam 57, in particular for caul plate transportation.

Obvious modifications or variations to the above description are possible, in respect of the sizes, the shapes, the materials, the components, the circuit elements, the connections and contacts, as well as in respect of the details of the circuitry, of the structure illustrated and of the operation method, without departing from the scope of the invention as defined in the following claims.

The invention claimed is:

1. An apparatus for manufacturing parts made of composite material, said apparatus configured to transport the parts from station to station within a manufacturing plant, a compaction device configured to compact the composite material, and the apparatus comprising:
   a sling having a substantially concave surface and at least one hollow portion formed on the concave surface, wherein a surface of the at least one hollow portion includes holes;
   a connector, for a vacuum source, disposed on the sling; and
   at least one strip of porous material, which is made of resilient semi-closed foam having semi-closed cells that are porous in an uncompressed form and that block a flow of air in a compressed form, wherein said semi-closed are not fully evacuated in the compressed form, the at least one strip of porous material secured to the at least one hollow portion and projecting out of the hollow portion so as to project from the concave surface in both the uncompressed form and in the compressed form,
   wherein the at least one strip of porous material includes through-holes, separate and distinct from the semi-closed cells, arranged to correspond with the holes in the at least one hollow portion surface, in the at least one strip of porous material compressed state, when the semi-closed holes block the flow air there-through,
   wherein the sling is configured to pick up and transport at least one compaction device through application of the vacuum source via the through holes of the at least one strip of porous material in the compressed state,
   wherein said porous material in the compressed state exerts a sealing action between the sting and the compaction device.

2. The apparatus as claimed in claim 1, wherein the number and the diameters of said holes in the at least one hollow portion surface, and the number and the diameters of the through-holes in the at least one strip of porous material are determined depending on weight and size characteristics of the compaction device.

3. The apparatus as claimed in claim 1, wherein said at least one strip of porous material is configured so as to project from the surface of the sling in order to be in contact with the compaction device during transport of the compaction device upon application of the vacuum source.

4. The apparatus as claimed in claim 1, comprising:
 a bridge crane arranged to be displaced in at least one certain direction;
 interface means interposed between said bridge crane and said sling and arranged to be displaced in any direction on a plane orthogonal to said certain direction.

5. The apparatus as claimed in claim 4, wherein said interface means comprises at least first and second floating devices each having at least fixed first members, connected to the bridge crane, and at least movable second members, removably connected with said sling, at least one rigid connecting member being provided for mutually connecting said movable second members.

6. The apparatus as claimed in claim 1, wherein the parts made of composite material are sections for an aircraft fuselage and the apparatus is configured to manufacture the sections.

7. The apparatus as claimed in claim 1, wherein the compaction device is a caul plate and the apparatus is configured to transport the caul plate.

8. The apparatus as claimed in claim 7, wherein the caul plate is 10 to 15 meters in length.

9. The apparatus as claimed in claim 7, wherein the caul plate is 2 to 3 meters in width.

10. The apparatus as claimed in claim 7, wherein the caul plate weighs over 200 kilograms.

11. The apparatus as claimed in claim 7, wherein the at least one strip of porous material is compressed when subject to the application of the vacuum source to pick up the caul plate and subsequently expanded when the vacuum source is stopped, thereby causing the caul plate to be pushed against the composite material.

12. An apparatus for manufacturing parts made of composite material, comprising:
 a sling coupled to a vacuum source and configured to pick up a caul plate and transport and attach the caul plate to the composite material, the sling having at least one strip of porous material secured thereto, the porous material made of resilient semi-closed foam having semi-closed cells;
 the sling configured to pick up the caul plate by subjecting the strip of porous material to vacuum, wherein the sling includes a plurality of holes;
 the strip of porous material is compressed when subject to the vacuum to pick up the caul plate and subsequently expanded when the vacuum is released, thereby causing the caul plate to be pushed against composite material,
 wherein the strip of porous material includes through holes which communicate with the plurality of holes of the sling while the strip of porous material is compressed, so as to maintain a vacuum force through the through-holes during a state of compression, wherein said semi-closed are not fully evacuated in said state of compression,
 wherein said porous material in the compressed state exerts a sealing action between the sling and the compaction device.

* * * * *